US007840689B2

(12) United States Patent
Stewart

(10) Patent No.: US 7,840,689 B2
(45) Date of Patent: Nov. 23, 2010

(54) DYNAMICALLY MODIFYING THE DISPLAY OF A COMPUTING DEVICE TO PROVIDE ADVERTISEMENTS

(75) Inventor: Brett B. Stewart, Austin, TX (US)

(73) Assignee: Wayport, Inc., Austin, TX (US)

( * ) Notice: Subject to any disclaimer, the term of this patent is extended or adjusted under 35 U.S.C. 154(b) by 99 days.

(21) Appl. No.: 11/402,132

(22) Filed: Apr. 11, 2006

(65) Prior Publication Data
US 2006/0183467 A1    Aug. 17, 2006

Related U.S. Application Data

(60) Continuation of application No. 10/776,293, filed on Feb. 11, 2004, which is a continuation of application No. 09/755,649, filed on Jan. 5, 2001, now Pat. No. 6,697,018, which is a division of application No. 09/382,551, filed on Aug. 25, 1999, now Pat. No. 6,326,918, which is a continuation of application No. 09/186,131, filed on Nov. 4, 1998, now Pat. No. 5,969,678, which is a continuation of application No. 08/470,004, filed on Jun. 6, 1995, now Pat. No. 5,835,061.

(51) Int. Cl.
*G06F 15/16* (2006.01)
(52) U.S. Cl. ............... 709/229; 709/202; 709/203; 709/227; 709/228
(58) Field of Classification Search ................ 709/202, 709/203, 227, 228, 229
See application file for complete search history.

(56) References Cited

U.S. PATENT DOCUMENTS

| 4,021,780 A | 5/1977 | Narey et al. |
| 4,255,619 A | 3/1981 | Saito |
| 4,445,118 A | 4/1984 | Taylor et al. |
| 4,536,647 A | 8/1985 | Atalla et al. |
| 4,757,267 A | 7/1988 | Riskin |
| 4,841,560 A | 6/1989 | Chan et al. |
| 4,845,504 A | 7/1989 | Roberts et al. |
| 4,922,516 A | 5/1990 | Butler et al. |
| 4,973,952 A * | 11/1990 | Malec et al. ............... 340/5.91 |
| 4,974,170 A | 11/1990 | Bouve et al. |
| 4,977,399 A | 12/1990 | Price et al. |

(Continued)

OTHER PUBLICATIONS

Bill N. Schilit and Marvin M. Theimer, Disseminating Active Map Information Mobile Hosts, IEEE Network, Sep./Oct. 1994.

(Continued)

*Primary Examiner*—Thu Nguyen
*Assistant Examiner*—Hieu T Hoang
(74) *Attorney, Agent, or Firm*—Dillon & Yudell LLP

(57) ABSTRACT

A geographic-based communications service system has a mobile unit for transmitting/receiving information, and access points connected to a network. The access points are arranged in a known geographic locations and transmit and receive information from the mobile unit. When one of the access points detects the presence of the mobile unit, it sends a signal to the network indicating the location of the mobile unit and the information requested by the mobile unit. Based on the signal received from the access point, the network communicates with information providers connected to the network and provides data to the mobile unit through the access point corresponding to the location of the mobile unit.

36 Claims, 2 Drawing Sheets

U.S. PATENT DOCUMENTS

| | | | |
|---|---|---|---|
| 5,089,814 A | 2/1992 | DeLuca et al. | |
| 5,095,532 A | 3/1992 | Mardus | |
| 5,122,795 A | 6/1992 | Cubley et al. | |
| 5,131,020 A * | 7/1992 | Liebesny et al. | 455/414.3 |
| 5,185,857 A | 2/1993 | Rozmanith et al. | |
| 5,223,844 A | 6/1993 | Mansell et al. | |
| 5,243,652 A | 9/1993 | Teare et al. | |
| 5,245,608 A * | 9/1993 | Deaton, Jr. et al. | 370/469 |
| 5,264,822 A | 11/1993 | Vogelman et al. | |
| 5,265,070 A | 11/1993 | Minowa | |
| 5,303,393 A | 4/1994 | Noreen et al. | |
| 5,321,242 A | 6/1994 | Heath, Jr. | |
| 5,363,377 A | 11/1994 | Sharpe | |
| 5,365,516 A | 11/1994 | Jandrell | |
| 5,390,237 A | 2/1995 | Hoffman et al. | |
| 5,404,505 A * | 4/1995 | Levinson | 707/10 |
| 5,432,841 A * | 7/1995 | Rimer | 455/457 |
| 5,444,444 A | 8/1995 | Ross | |
| 5,451,757 A | 9/1995 | Heath, Jr. | |
| 5,455,807 A | 10/1995 | Nepple | |
| 5,461,627 A | 10/1995 | Rypinski | |
| 5,475,735 A * | 12/1995 | Williams et al. | 455/403 |
| 5,485,163 A * | 1/1996 | Singer et al. | 342/457 |
| 5,487,103 A | 1/1996 | Richardson | |
| 5,493,309 A | 2/1996 | Bjornholt | |
| 5,497,414 A | 3/1996 | Bartholomew | |
| 5,504,482 A | 4/1996 | Schreder | |
| 5,511,111 A | 4/1996 | Serbetcioglu et al. | |
| 5,511,233 A | 4/1996 | Otten | |
| 5,512,908 A | 4/1996 | Herrick | |
| 5,513,263 A | 4/1996 | White et al. | |
| 5,528,248 A | 6/1996 | Steiner et al. | |
| 5,544,354 A * | 8/1996 | May et al. | 707/4 |
| 5,559,520 A | 9/1996 | Barzegar et al. | |
| 5,566,235 A | 10/1996 | Hetz | |
| 5,581,479 A * | 12/1996 | McLaughlin et al. | 725/145 |
| 5,583,864 A * | 12/1996 | Lightfoot et al. | 370/396 |
| 5,586,254 A | 12/1996 | Kondo et al. | |
| 5,588,042 A | 12/1996 | Comer | |
| 5,590,196 A * | 12/1996 | Moreau | 705/78 |
| 5,590,398 A | 12/1996 | Matthews | |
| 5,592,470 A * | 1/1997 | Rudrapatna et al. | 370/320 |
| 5,594,779 A * | 1/1997 | Goodman | 455/3.04 |
| 5,596,625 A | 1/1997 | LeBlanc | |
| 5,602,843 A | 2/1997 | Gray | |
| 5,610,973 A | 3/1997 | Comer | |
| 5,625,364 A | 4/1997 | Herrick et al. | |
| 5,625,668 A | 4/1997 | Loomis | |
| 5,627,549 A | 5/1997 | Park | |
| 5,636,245 A * | 6/1997 | Ernst et al. | 375/259 |
| 5,646,632 A | 7/1997 | Khan et al. | |
| 5,654,959 A | 8/1997 | Baker et al. | |
| 5,657,375 A | 8/1997 | Connolly et al. | |
| 5,661,492 A | 8/1997 | Shoap et al. | |
| 5,663,734 A | 9/1997 | Krasner | |
| 5,664,948 A * | 9/1997 | Dimitriadis et al. | 434/307 R |
| 5,666,481 A | 9/1997 | Lewis | |
| 5,677,905 A * | 10/1997 | Bigham et al. | 370/395.21 |
| 5,687,212 A | 11/1997 | Kinser, Jr. et al. | |
| 5,689,431 A | 11/1997 | Rudow et al. | |
| 5,694,453 A | 12/1997 | Fuller et al. | |
| 5,701,301 A | 12/1997 | Weisser, Jr. | |
| 5,704,049 A * | 12/1997 | Briechle | 715/744 |
| 5,712,899 A | 1/1998 | Pace, II | |
| 5,713,075 A | 1/1998 | Threadgill et al. | |
| 5,714,948 A | 2/1998 | Farmakis et al. | |
| 5,717,688 A | 2/1998 | Belanger et al. | |
| 5,720,033 A | 2/1998 | Deo | |
| 5,724,521 A * | 3/1998 | Dedrick | 705/26 |
| 5,727,057 A | 3/1998 | Emery et al. | |
| 5,729,680 A | 3/1998 | Belanger et al. | |
| 5,771,283 A | 6/1998 | Chang et al. | |
| 5,774,534 A | 6/1998 | Mayer | |
| 5,778,304 A | 7/1998 | Grube et al. | |
| 5,790,974 A | 8/1998 | Tognazzini | |
| 5,794,210 A | 8/1998 | Goldhaber et al. | |
| 5,796,727 A | 8/1998 | Harrison et al. | |
| 5,798,733 A | 8/1998 | Ethridge | |
| 5,806,018 A | 9/1998 | Smith et al. | |
| 5,812,763 A | 9/1998 | Teng | |
| 5,819,155 A | 10/1998 | Worthy et al. | |
| 5,835,061 A | 11/1998 | Stewart | |
| 5,838,774 A | 11/1998 | Weisser, Jr. | |
| 5,842,010 A * | 11/1998 | Jain et al. | 707/104.1 |
| 5,845,211 A | 12/1998 | Roach, Jr. | |
| 5,852,775 A | 12/1998 | Hidary | |
| 5,855,007 A | 12/1998 | Jovicic et al. | |
| 5,870,555 A | 2/1999 | Pruett et al. | |
| 5,870,724 A | 2/1999 | Lawlor et al. | |
| 5,875,186 A | 2/1999 | Belanger et al. | |
| 5,875,401 A | 2/1999 | Rochkind | |
| 5,878,126 A | 3/1999 | Velamuri et al. | |
| 5,880,958 A | 3/1999 | Helms et al. | |
| 5,881,131 A | 3/1999 | Farris et al. | |
| 5,884,284 A | 3/1999 | Peters et al. | |
| 5,887,259 A * | 3/1999 | Zicker et al. | 455/434 |
| 5,889,953 A | 3/1999 | Thebaut et al. | |
| 5,896,440 A | 4/1999 | Reed et al. | |
| 5,897,640 A | 4/1999 | Veghte et al. | |
| 5,903,636 A | 5/1999 | Malik | |
| 5,907,544 A | 5/1999 | Rypinski | |
| 5,920,846 A | 7/1999 | Storch et al. | |
| 5,922,040 A | 7/1999 | Prabhakaran | |
| 5,923,702 A | 7/1999 | Brenner et al. | |
| 5,933,420 A | 8/1999 | Jaszewski et al. | |
| 5,938,721 A | 8/1999 | Dussell et al. | |
| 5,949,867 A | 9/1999 | Sonnenberg | |
| 5,950,130 A | 9/1999 | Coursey | |
| 5,961,593 A | 10/1999 | Gabber et al. | |
| 5,963,866 A | 10/1999 | Palamara et al. | |
| 5,963,913 A | 10/1999 | Tenneuse et al. | |
| 5,968,176 A | 10/1999 | Nessett et al. | |
| 5,969,678 A | 10/1999 | Stewart | |
| 5,982,867 A | 11/1999 | Urban et al. | |
| 5,983,091 A | 11/1999 | Rodriguez | |
| 5,987,381 A | 11/1999 | Oshizawa | |
| 5,991,287 A | 11/1999 | Diepstraten et al. | |
| 5,995,015 A | 11/1999 | DeTemple et al. | |
| 6,006,090 A * | 12/1999 | Coleman et al. | 455/432.1 |
| 6,009,398 A | 12/1999 | Mueller et al. | |
| 6,011,975 A | 1/2000 | Emery et al. | |
| 6,026,151 A | 2/2000 | Bauer et al. | |
| 6,028,921 A | 2/2000 | Malik et al. | |
| 6,047,327 A | 4/2000 | Tso et al. | |
| 6,055,637 A | 4/2000 | Hudson et al. | |
| 6,058,106 A | 5/2000 | Cudak et al. | |
| 6,067,082 A * | 5/2000 | Enmei | 345/174 |
| 6,067,297 A | 5/2000 | Beach | |
| 6,076,080 A | 6/2000 | Morscheck et al. | |
| 6,085,086 A | 7/2000 | La Porta et al. | |
| 6,091,956 A | 7/2000 | Hollenberg | |
| 6,101,381 A | 8/2000 | Tajima et al. | |
| 6,101,443 A | 8/2000 | Kato et al. | |
| 6,112,186 A | 8/2000 | Bergh et al. | |
| 6,115,669 A | 9/2000 | Watanabe et al. | |
| 6,122,520 A | 9/2000 | Want et al. | |
| 6,133,853 A | 10/2000 | Obradovich et al. | |
| 6,138,003 A | 10/2000 | Kingdon et al. | |
| 6,138,119 A | 10/2000 | Hall et al. | |
| 6,141,609 A | 10/2000 | Herdeg et al. | |
| 6,144,645 A | 11/2000 | Struhsaker et al. | |
| 6,154,152 A | 11/2000 | Ito | |
| 6,154,637 A | 11/2000 | Wright et al. | |
| 6,157,829 A | 12/2000 | Grube et al. | |

| Patent No. | Kind | Date | Inventor |
|---|---|---|---|
| 6,157,946 A * | | 12/2000 | Itakura et al. ............... 709/217 |
| 6,163,274 A | | 12/2000 | Lindgren |
| 6,167,255 A | | 12/2000 | Kennedy, III et al. |
| 6,182,226 B1 | | 1/2001 | Reid et al. |
| 6,337,810 B1 | | 1/2001 | Geiger et al. |
| 6,184,829 B1 | | 2/2001 | Stilp |
| 6,185,426 B1 | | 2/2001 | Alperovich et al. |
| 6,185,484 B1 | | 2/2001 | Rhinehart |
| 6,192,314 B1 | | 2/2001 | Khavakh et al. |
| 6,202,054 B1 * | | 3/2001 | Lawlor et al. ................. 705/42 |
| 6,205,478 B1 | | 3/2001 | Sugano et al. |
| 6,208,854 B1 | | 3/2001 | Roberts et al. |
| 6,208,866 B1 | | 3/2001 | Rouhollahzadeh et al. |
| 6,226,277 B1 | | 5/2001 | Chuah |
| 6,229,477 B1 | | 5/2001 | Chang et al. |
| 6,229,810 B1 | | 5/2001 | Gerszberg et al. |
| 6,233,329 B1 | | 5/2001 | Urban et al. |
| 6,233,452 B1 | | 5/2001 | Nishino |
| 6,236,360 B1 | | 5/2001 | Rudow et al. |
| 6,236,940 B1 | | 5/2001 | Rudow et al. |
| 6,246,361 B1 | | 6/2001 | Weill et al. |
| 6,259,405 B1 | | 7/2001 | Stewart et al. |
| 6,263,209 B1 | | 7/2001 | Reed et al. |
| 6,278,938 B1 | | 8/2001 | Alumbaugh |
| 6,285,665 B1 | | 9/2001 | Chuah et al. |
| 6,285,931 B1 | | 9/2001 | Hattori et al. |
| 6,298,234 B1 | | 10/2001 | Brunner |
| 6,308,273 B1 | | 10/2001 | Goertzel et al. |
| 6,311,069 B1 | | 10/2001 | Havinis et al. |
| 6,317,718 B1 | | 11/2001 | Fano |
| 6,321,092 B1 | | 11/2001 | Fitch et al. |
| 6,324,396 B1 | | 11/2001 | Vasa et al. |
| 6,326,918 B1 | | 12/2001 | Stewart |
| 6,327,254 B1 | | 12/2001 | Chuah |
| 6,327,357 B1 | | 12/2001 | Meek et al. |
| 6,332,127 B1 | | 12/2001 | Bandera et al. |
| 6,332,163 B1 | | 12/2001 | Bowman-Amuah |
| 6,343,290 B1 | | 1/2002 | Cossins et al. |
| 6,353,664 B1 | | 3/2002 | Cannon et al. |
| 6,359,880 B1 | | 3/2002 | Curry et al. |
| 6,360,101 B1 | | 3/2002 | Irvin |
| 6,363,421 B2 | | 3/2002 | Barker et al. |
| 6,366,561 B1 | | 4/2002 | Bender |
| 6,377,548 B1 | | 4/2002 | Chuah et al. |
| 6,377,810 B1 | | 4/2002 | Geiger et al. |
| 6,377,982 B1 | | 4/2002 | Rai et al. |
| 6,385,531 B2 | | 5/2002 | Bates et al. |
| 6,385,591 B1 | | 5/2002 | Mankoff |
| 6,389,426 B1 | | 5/2002 | Turnbull et al. |
| 6,393,482 B1 | | 5/2002 | Rai et al. |
| 6,400,722 B1 | | 6/2002 | Chuah et al. |
| 6,407,673 B1 | | 6/2002 | Lane |
| 6,408,307 B1 | | 6/2002 | Semple et al. |
| 6,414,635 B1 | | 7/2002 | Stewart et al. |
| 6,414,950 B1 | | 7/2002 | Rai et al. |
| 6,415,019 B1 | | 7/2002 | Savaglio et al. |
| 6,418,308 B1 | | 7/2002 | Heinonen et al. |
| 6,421,441 B1 | | 7/2002 | Dzuban |
| 6,421,714 B1 | | 7/2002 | Rai et al. |
| 6,427,073 B1 | | 7/2002 | Kortesalmi et al. |
| 6,427,119 B1 | | 7/2002 | Stefan et al. |
| 6,430,276 B1 | | 8/2002 | Bouvier et al. |
| 6,430,562 B1 | | 8/2002 | Kardos et al. |
| 6,442,391 B1 | | 8/2002 | Johansson et al. |
| 6,442,479 B1 | | 8/2002 | Barton |
| 6,442,687 B1 | | 8/2002 | Savage |
| 6,449,272 B1 | | 9/2002 | Chuah et al. |
| 6,449,497 B1 | | 9/2002 | Kirbas et al. |
| 6,452,498 B2 | | 9/2002 | Stewart |
| 6,463,533 B1 | | 10/2002 | Calamera et al. |
| 6,470,378 B1 | | 10/2002 | Tracton et al. |
| 6,470,447 B1 | | 10/2002 | Lambert et al. |
| 6,473,626 B1 | | 10/2002 | Nevoux et al. |
| 6,477,382 B1 | | 11/2002 | Mansfield et al. |
| 6,477,526 B2 | | 11/2002 | Hayashi et al. |
| 6,484,029 B2 | | 11/2002 | Hughes et al. |
| 6,484,092 B2 | | 11/2002 | Seibel |
| 6,484,148 B1 | | 11/2002 | Boyd |
| 6,490,291 B1 | | 12/2002 | Lee et al. |
| 6,496,491 B2 | | 12/2002 | Chuah et al. |
| 6,496,931 B1 | | 12/2002 | Rajchel et al. |
| 6,505,046 B1 | | 1/2003 | Baker |
| 6,505,048 B1 | | 1/2003 | Moles et al. |
| 6,505,049 B1 | | 1/2003 | Dorenbosch |
| 6,505,120 B2 | | 1/2003 | Yamashita et al. |
| 6,505,163 B1 | | 1/2003 | Zhang et al. |
| 6,512,754 B2 | | 1/2003 | Feder et al. |
| 6,516,055 B1 | | 2/2003 | Bedeski et al. |
| 6,516,416 B2 | | 2/2003 | Gregg et al. |
| 6,519,252 B2 | | 2/2003 | Sallberg |
| 6,519,458 B2 | | 2/2003 | Oh et al. |
| 6,522,876 B1 | | 2/2003 | Weiland et al. |
| 6,526,275 B1 | | 2/2003 | Calvert |
| 6,526,349 B2 | | 2/2003 | Bullock et al. |
| 6,532,418 B2 | | 3/2003 | Chun et al. |
| 6,545,596 B1 | | 4/2003 | Moon |
| 6,546,257 B1 | | 4/2003 | Stewart |
| 6,560,442 B1 | | 5/2003 | Yost et al. |
| 6,560,461 B1 | | 5/2003 | Fomukong et al. |
| 6,577,643 B1 | | 6/2003 | Rai et al. |
| 6,577,644 B1 | | 6/2003 | Chuah et al. |
| 6,594,482 B1 | | 7/2003 | Findikli et al. |
| 6,618,474 B1 | | 9/2003 | Reese |
| 6,618,593 B1 | | 9/2003 | Drutman et al. |
| 6,622,016 B1 | | 9/2003 | Sladek et al. |
| 6,628,627 B1 | | 9/2003 | Zendle et al. |
| 6,628,928 B1 | | 9/2003 | Crosby et al. |
| 6,628,938 B1 | | 9/2003 | Rachabathuni et al. |
| 6,633,633 B1 | | 10/2003 | Bedingfield |
| 6,640,184 B1 | | 10/2003 | Rabe |
| 7,124,101 B1 | | 10/2003 | Mikurak |
| 6,647,257 B2 | | 11/2003 | Owensby |
| 6,647,269 B2 | | 11/2003 | Hendrey et al. |
| 6,650,901 B1 | | 11/2003 | Schuster et al. |
| 6,654,610 B1 | | 11/2003 | Chen et al. |
| 6,662,014 B1 | | 12/2003 | Walsh |
| 6,665,536 B1 | | 12/2003 | Mahany |
| 6,665,718 B1 | | 12/2003 | Chuah et al. |
| 6,671,272 B2 | | 12/2003 | Vaziri et al. |
| 6,675,017 B1 | | 1/2004 | Zellner et al. |
| 6,675,208 B1 | | 1/2004 | Rai et al. |
| 6,677,894 B2 | | 1/2004 | Sheynblat et al. |
| 6,697,018 B2 | | 2/2004 | Stewart |
| 6,697,783 B1 | | 2/2004 | Brinkman et al. |
| 6,701,160 B1 | | 3/2004 | Pinder et al. |
| 6,701,251 B2 | | 3/2004 | Stefan et al. |
| 6,704,311 B1 | | 3/2004 | Chuah et al. |
| 6,716,101 B1 | | 4/2004 | Meadows et al. |
| 6,721,406 B1 | | 4/2004 | Contractor |
| 6,725,048 B2 | | 4/2004 | Mao et al. |
| 6,732,080 B1 | | 5/2004 | Blants |
| 6,732,101 B1 | | 5/2004 | Cook |
| 6,732,176 B1 | | 5/2004 | Stewart et al. |
| 6,738,808 B1 | | 5/2004 | Zellner et al. |
| 6,754,504 B1 | | 6/2004 | Reed |
| 6,754,582 B1 | | 6/2004 | Smith et al. |
| 6,759,960 B2 | | 7/2004 | Stewart |
| 6,772,064 B1 | | 8/2004 | Smith et al. |
| 6,799,049 B1 | | 9/2004 | Zellner et al. |
| 6,801,509 B1 | | 10/2004 | Chuah et al. |
| 6,816,720 B2 | | 11/2004 | Hussain et al. |
| 6,819,929 B2 | | 11/2004 | Antonucci et al. |
| 6,829,475 B1 | | 12/2004 | Lee et al. |
| 6,850,758 B1 | | 2/2005 | Paul et al. |
| 6,867,733 B2 | | 3/2005 | Sandhu et al. |
| 6,868,074 B1 | | 3/2005 | Hanson |

| | | |
|---|---|---|
| 6,874,011 B1 | 3/2005 | Spielman |
| 6,876,858 B1 | 4/2005 | Duvall et al. |
| 6,898,569 B1 | 5/2005 | Bansal et al. |
| 6,937,869 B1 | 8/2005 | Terry |
| 6,954,147 B1 | 10/2005 | Cromer et al. |
| 6,985,747 B2 | 1/2006 | Chithambaram |
| 6,999,572 B1 | 2/2006 | Shaffer et al. |
| 7,005,985 B1 | 2/2006 | Steeves |
| 7,023,995 B1 | 4/2006 | Olsson |
| 7,043,231 B2 | 5/2006 | Bhatia et al. |
| 7,058,594 B2 | 6/2006 | Stewart et al. |
| 7,069,319 B2 | 6/2006 | Zellner et al. |
| 7,009,556 B2 | 7/2006 | Stewart et al. |
| 7,085,555 B2 | 8/2006 | Zellner et al. |
| 7,103,368 B2 | 9/2006 | Teshima |
| 7,103,476 B2 | 9/2006 | Smith et al. |
| 7,106,843 B1 | 9/2006 | Gainsboro et al. |
| 7,110,749 B2 | 9/2006 | Zellner et al. |
| 7,116,977 B1 | 10/2006 | Moton et al. |
| 7,130,631 B2 | 10/2006 | Enzmann et al. |
| 7,139,722 B2 | 11/2006 | Perrella et al. |
| 7,155,199 B2 * | 12/2006 | Zalewski et al. ............. 455/403 |
| 7,181,225 B1 | 2/2007 | Moton et al. |
| 7,181,529 B2 | 2/2007 | Bhatia et al. |
| 7,188,027 B2 | 3/2007 | Smith et al. |
| 7,190,960 B2 | 3/2007 | Wilson et al. |
| 7,203,502 B2 | 4/2007 | Wilson et al. |
| 7,212,829 B1 | 5/2007 | Lau et al. |
| 7,224,978 B2 | 5/2007 | Zellner et al. |
| 7,236,799 B2 | 6/2007 | Wilson et al. |
| RE39,717 E * | 7/2007 | Yates et al. ................. 709/201 |
| 7,245,925 B2 | 7/2007 | Zellner |
| 7,260,378 B2 | 8/2007 | Holland et al. |
| 7,272,493 B1 | 9/2007 | Hamrick et al. |
| 7,292,939 B2 | 11/2007 | Smith et al. |
| 7,295,924 B2 | 11/2007 | Smith et al. |
| 7,362,851 B2 | 4/2008 | Contractor |
| 7,383,052 B2 | 6/2008 | Moton et al. |
| 2001/0001239 A1 | 5/2001 | Stewart |
| 2001/0021646 A1 | 9/2001 | Antonucci et al. |
| 2001/0034709 A1 | 10/2001 | Stoifo et al. |
| 2001/0049275 A1 | 12/2001 | Pierry et al. |
| 2001/0051911 A1 | 12/2001 | Marks et al. |
| 2002/0035474 A1 | 3/2002 | Alpdemir |
| 2002/0037709 A1 | 3/2002 | Bhatia et al. |
| 2002/0037722 A1 | 3/2002 | Hussain et al. |
| 2002/0037731 A1 | 3/2002 | Mao et al. |
| 2002/0037744 A1 | 3/2002 | Bhatia et al. |
| 2002/0037750 A1 | 3/2002 | Hussain et al. |
| 2002/0038362 A1 | 3/2002 | Bhatia et al. |
| 2002/0038384 A1 | 3/2002 | Khan et al. |
| 2002/0038386 A1 | 3/2002 | Bhatia et al. |
| 2002/0046090 A1 | 4/2002 | Stewart |
| 2002/0052781 A1 | 5/2002 | Aufricht et al. |
| 2002/0077083 A1 | 6/2002 | Zellner et al. |
| 2002/0077084 A1 | 6/2002 | Zellner et al. |
| 2002/0077118 A1 | 6/2002 | Zellner et al. |
| 2002/0077130 A1 | 6/2002 | Owensby |
| 2002/0077897 A1 | 6/2002 | Zellner et al. |
| 2002/0087335 A1 | 7/2002 | Meyers et al. |
| 2002/0090932 A1 | 7/2002 | Bhatia et al. |
| 2002/0095312 A1 | 7/2002 | Wheat |
| 2002/0102993 A1 | 8/2002 | Hendrey et al. |
| 2002/0107027 A1 | 8/2002 | O'Neil |
| 2002/0120713 A1 | 8/2002 | Gupta et al. |
| 2002/0161637 A1 | 10/2002 | Sugaya |
| 2002/0174147 A1 | 11/2002 | Wang et al. |
| 2003/0003990 A1 | 1/2003 | Von Kohorn |
| 2003/0016233 A1 | 1/2003 | Charpentier |
| 2003/0018527 A1 | 1/2003 | Filepp et al. |
| 2003/0140088 A1 | 7/2003 | Robinson et al. |
| 2003/0169151 A1 | 9/2003 | Ebling et al. |
| 2004/0002329 A1 | 1/2004 | Bhatia et al. |
| 2004/0097243 A1 | 5/2004 | Nguyen et al. |
| 2004/0111269 A1 | 6/2004 | Koch |
| 2004/0164898 A1 | 8/2004 | Stewart |
| 2004/0186902 A1 | 9/2004 | Stewart et al. |
| 2004/0203903 A1 | 10/2004 | Wilson et al. |
| 2004/0205198 A1 | 10/2004 | Zellner et al. |
| 2004/0266453 A1 | 12/2004 | Maanoja et al. |
| 2005/0017068 A1 * | 1/2005 | Zalewski et al. ............. 235/380 |
| 2005/0043036 A1 | 2/2005 | Ioppe et al. |
| 2005/0060365 A1 | 3/2005 | Robinson et al. |
| 2005/0096067 A1 | 5/2005 | Martin |
| 2005/0114777 A1 | 5/2005 | Szeto |
| 2005/0151655 A1 | 7/2005 | Hamrick et al. |
| 2005/0245097 A1 | 11/2005 | Hamrick et al. |
| 2005/0272445 A1 | 12/2005 | Zellner |
| 2006/0030335 A1 | 2/2006 | Zellner et al. |
| 2006/0030339 A1 | 2/2006 | Zhovnirovsky et al. |
| 2006/0059043 A1 | 3/2006 | Chan et al. |
| 2006/0089134 A1 | 4/2006 | Moton et al. |
| 2006/0094447 A1 | 5/2006 | Zellner |
| 2006/0099966 A1 | 5/2006 | Moton et al. |
| 2006/0105784 A1 | 5/2006 | Zellner et al. |
| 2006/0106537 A1 | 5/2006 | Hamrick et al. |
| 2006/0164302 A1 | 7/2006 | Stewart et al. |
| 2006/0167986 A1 | 7/2006 | Trzyna et al. |
| 2006/0183467 A1 | 8/2006 | Stewart et al. |
| 2006/0189327 A1 | 8/2006 | Zellner et al. |
| 2006/0189332 A1 | 8/2006 | Benco et al. |
| 2006/0195570 A1 | 8/2006 | Zellner et al. |
| 2006/0253252 A1 | 11/2006 | Hamrick et al. |
| 2007/0010260 A1 | 1/2007 | Zellner et al. |
| 2007/0042789 A1 | 2/2007 | Moton et al. |
| 2007/0105565 A1 | 5/2007 | Enzmann et al. |
| 2007/0124721 A1 | 5/2007 | Cowing et al. |
| 2007/0136603 A1 | 6/2007 | Kuecuekyan |
| 2007/0250920 A1 | 10/2007 | Lindsay |
| 2008/0096529 A1 | 4/2008 | Zellner |

OTHER PUBLICATIONS

Andy Harter and Andy Hooper, A Distributed Location system for the Active Office, IEEE Network, Jan./Feb. 1994.

Max J. Egenhofer, Spatial SQL: A Query and Presentation Language, IEEE Network, Feb. 1994.

Mike Spreitzer and Marvin Theimer, Providing Location Information in a Ubiquitous, Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

Ronald Azuma, Tracking Requirements for Augmented Reality, Communications of the ACM, vol. 36 No. 1, Jan. 1992.

Roy Want, et al., The Active Badge Location System, ACM Transactions on Information Systems, vol. 10, No. 1, Jan. 1992.

Marvin White, Emerging Requirements for Digital Maps for In-Vehicle Pathfinding and Other Traveller Assistance, Vehicular Navigation and Information Systems Conference Proceedings, Part 1, Oct. 1991.

Fred Phail, The Power of a Personal Computer for Car Information and Communications Systems, Vehicular Navigation and Information Systems Conference Proceedings, Part 1, Oct. 1991.

Thomas A. Dingus, et al., Human Factors Engineering the TravTek Driver Interface, Vehicular Navigation and Information Systems Conference Proceedings, Part II, Oct. 1991.

Michael Muffat et al., European Cooperation on Dual Mode Route Guidance Perspectives for Advanced Research Partners, Vehicular Navigation and Information Systems Conference Proceedings, Part II, Oct. 1991.

* cited by examiner

DYNAMICALLY MODIFYING THE DISPLAY OF A COMPUTING DEVICE TO PROVIDE ADVERTISEMENTS

CROSS REFERENCE TO RELATED APPLICATIONS

This application is a continuation of application Ser. No. 10/776,293 filed on Feb. 11, 2004 titled, "Providing Information to a Computing Device Based on Known Location and User Information," which is a continuation of application Ser. No. 09/755,649 filed on Jan. 5, 2001 titled, "Geographic-Based Network System," now U.S. Pat. No. 6,697,018, which was a divisional of U.S. application Ser. No. 09/382,551 filed Aug. 25, 1999, titled "Method and Apparatus for Geographic-Based Communications Service," now U.S. Pat. No. 6,326,918, which was a continuation of application Ser. No. 09/186,131, filed Nov. 4, 1998, titled "System for Hybrid Wired and Wireless Geographic-Based Communications Service," now U.S. Pat. No. 5,969,678, which was a continuation of application Ser. No. 08/470,004, filed Jun. 6, 1995, titled "Method and Apparatus for Geographic-Based Communications Service," now U.S. Pat. No. 5,835,061.

BACKGROUND OF THE INVENTION

1. Field of the Invention

The invention generally relates to a geographic-based communications service and, more particularly, is concerned with an apparatus and method for using known locations of wireless local area network access points (APs) to service mobile users (MUs) of portable smart devices (e.g., notebook, personal computers, PDA, etc.) who are in the vicinity of these APs.

2. Related Art

As technology improvements result in smaller, lighter and more portable computing devices, a wide variety of new applications and users will emerge. Users will not only operate such devices in stand alone mode, but with portability, users will also require the ability to send and receive information through such devices at any location. The need to communicate will arise in circumstances where hard wired links may not be readily available or practical or when the user of the portable computing device cannot be reached immediately. Moreover, a result of user mobility is that the precise location of the user is often variable or not determined. Conventional communications systems for computing devices are not equipped to handle such communication scenarios.

Commercially available personal computers or other similar devices are generally equipped with industry standard interface ports for driving a peripheral device such as printer a plotter, or a modem. While operating in an unknown, remote location not connected to a network, the portable personal computer user may be unaware of messages waiting for him. In addition, conventionally, the user must wait until reaching an office or other place with appropriate equipment to receive such messages and to transmit or print documents or other information prepared by the user on his personal device.

By way of example and not limitation, one type of mobile user is the traveller who passes through airports or similar mass transit centers (e.g., subway commuters), uses ground transportation and stays in a hotel. In a typical scenario, a traveller may use a personal computer to perform calculations or prepare documents on a personal computing device during an airplane flight. Simultaneously, associates may leave messages for the traveller on a network. In conventional systems, the users's work product and messages destined for the user are not available until the user arrives at a location where a wired connection to the user's network is available.

A further example of inefficiencies for the traveller concerns travel arrangements themselves. After arriving at an airport, the traveller proceeds to a car rental desk or to some other transportation location. The traveller typically waits in line while the car rental agency inquires about automobile preference, driver's license, method of payment, type of insurance required, etc. Having experienced some delay, the traveller is now on his way to a business location or hotel. Upon arriving at a hotel check-in/registration desk, the traveller often experiences further delay waiting in line and providing the check-in clerk with routine information such as address, length of stay, type of room desired, method of payment, etc. In addition, the business traveller must call back to his office to check for telephone messages, thereby incurring further delays.

While accessing data bases for information about the traveller, his preferences and requirements can reduce such delays, a common characteristic is that the pending arrival or presence of the traveller is not known to those who can act in advance. Further, conventional systems cannot generally locate a mobile user of a personal computing device and take advantage of that information to reduce the time required to complete routine activities or to provide the user options that can enhance the user's productivity.

In another example, when a user dials a telephone number to an automatic teller machine (ATM) locator, the user is promoted to key in his area code and exchange prefix. The locator system then identifies one or more ATMs within the user's area. However, the system requires the user to call in and cannot locate the user any more accurately than the telephone exchange area. Thus, the user could be advised of an ATM quite a physical distance from the user's location.

SUMMARY OF THE INVENTION

In view of the above limitations of the related art an object of the invention is to provide a system in which a mobile user can be geographically located automatically.

It is another object of the invention to provide a system which can automatically locate a user with greater precision than is currently available.

A still further object of the invention is to provide a system which integrates personal computing devices to networks such that routine tasks, such as travel routing can be accomplished more efficiently.

A still further object of the invention is to provide a system that allows a user to employ a personal computing device more effectively and to utilize otherwise idle time, such as time spent waiting at a car rental desk, a hotel registration desk and the like.

According to the invention, mobile users communicate with wireless local area net-works within the range of an access point (AP). When a user passes an access point, the access point recognizes the user, and the user's device can then retrieve data (telephone, E-mail messages, etc.) waiting for the user and transmit information (E-mail messages, print documents, requests for information from service providers, etc.) that the user may have for transmission to a desired recipient. For instance, this process could occur as a user exits an airplane and is detected by an access point in an airport.

Accordingly, the present invention is a directed toward a method and apparatus for using known locations of local area network APs (access points) to service mobile users who are in the vicinity of these APs. Such access points and mobile units typically communicate with each other in a wireless manner. The method according to the invention includes the steps of: (a) detecting the presence of a mobile unit in the vicinity of an access point and (b) transmitting/receiving information from the mobile unit to/from the network through the access point.

According to the invention, information and services can be provided by various providers connected to the network which are able to respond to unanticipated requests or which have acquired knowledge about the user's requirements, preferences and habits over a period of time and have extrapolated information from the user's past practices for probable future actions consistent with these past actions.

For example, in one application, an access point receives a print job from a user's mobile unit and sends it to a printer available at a destination point designated by the user so that the document is printed and available to the user upon his arrival at his destination. In another application according to the invention, upon detecting the arrival of a user's mobile unit at a destination, a message, for example, an E-mail message, is sent to the user's rental car agency. The agency can take appropriate actions so that the user's rental car is ready and the user does not waste time waiting in line. Using a similar approach, a user can be pre-registered at a hotel so that his room is ready upon arrival.

Thus, according to the invention, a geographic-based communications service system for mobile users includes a mobile unit for transmitting and receiving information and a plurality of access points connected to a network and arranged at known locations in a geographic region for transmitting the information to and receiving the information from said mobile unit. One of the access points detects the presence of a mobile unit and sends a signal to the network. A plurality of information providers are connected to the network. The network accesses the information providers based on the signal received from a mobile unit via the access points to provide data to the mobile unit or to another entity on behalf of the user of the mobile unit. In particular, the known location of the access point detecting the presence of the mobile unit defines the location of said mobile unit. Based on the location of the mobile unit as detected by the AP, a service provider on the network can take actions appropriate to the user's location, such as notifying a car rental agency of the user's presence or notifying the user of canceled flights and adjustments to the user's itinerary. Further according to the invention, clocks in the user's mobile device and event schedules can be updated automatically to correspond to the present time in the time zone where the access point detecting the user's mobile unit is located.

DETAILED DESCRIPTION OF THE PREFERRED EMBODIMENTS

Figure 1:
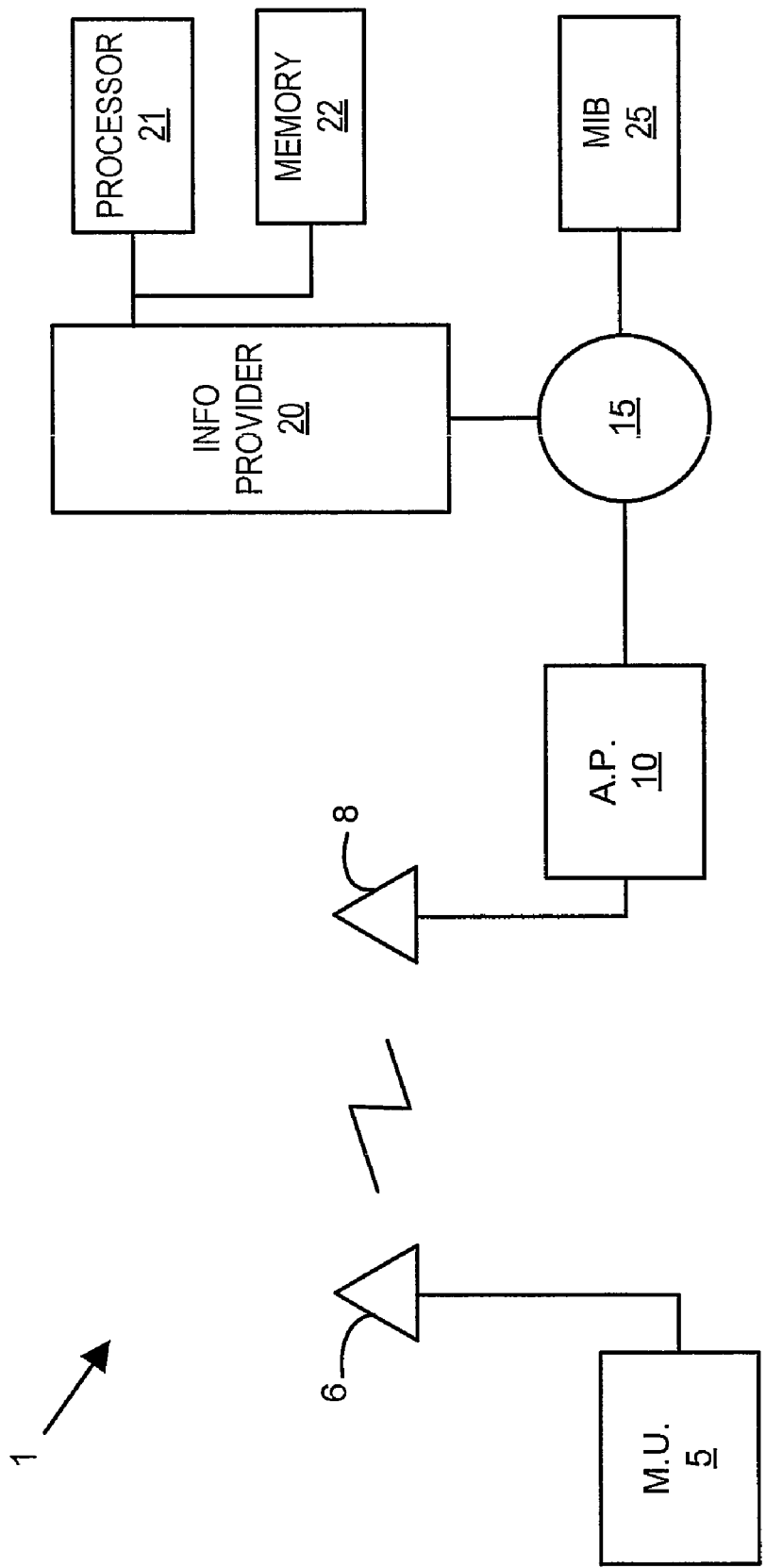
FIG. 1 is a representation of the geographic-based communications service system, according to the invention.

FIG. 1 shows a geographic-based communications service system, generally designated 1, according to the invention. The system includes a mobile unit (e.g., portable computer) 5, an AP (access point) 10, an information provider 20, a management information base (MIB) 25 and a centralized network 15. The information provider 20 will typically have a processor 21 and memory 22 with controlled access thereto. Typically, access point 10 and mobile unit 5 communicate in a wireless manner. Thus, mobile unit 5 and access point 10 would be equipped with an appropriate transmitter and receiver compatible in power and frequency range to establish such a wireless communication link. In addition, mobile unit would also be equipped with a code generator which generates an identification code that can be transmitted to and recognized by the access point 10 or a system accessed through access point 10. Such an identification code allows recognition of a user before providing access to system services, thereby providing a measure of security and a service billing mechanism.

Figure 2:
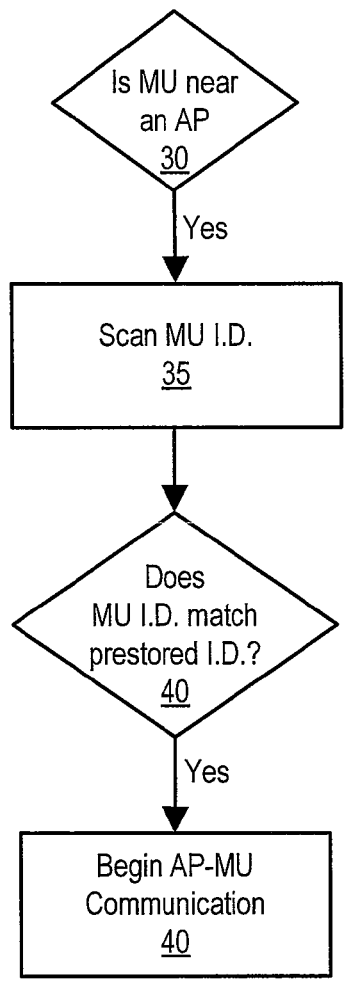
FIG. 2 is a flow chart showing a mobile unit interfacing with an access point, according to the system of FIG. 1.

FIG. 2 is a flow chart showing an implementation of the communication between the mobile unit 5 and an access point 10. In step 30, the access point 10 determines whether the mobile unit 5 is within the range of the access point 10. In steps 35 and 40, the access point 10 scans the mobile unit 5 and determines whether the mobile unit I.D. (identity) matches a prestored I.D., and in step 45, the communication between the mobile unit 5 and the access point 10 begins. The communication between mobile unit 5 and access point 10 may include sending and receiving information which may include text, voice data and video data.

As illustrated in FIG. 2 a first step according to the invention is establishing a connection between a mobile unit and an access point. Referring again to FIG. 1, the mobile unit 5 can send a beacon signal that is picked up by one of the APs 10 located in a plurality of locations within a geographic region. When the beacon signal is picked up by a particular AP 10, the beacon signal is transmitted back to the management information base (MIB) 25 by AP 10. Since the location of the access point is defined and known by MIB 25, detection of the presence of the mobile unit by an AP 10 allows MIB 25 to know exactly where the mobile user is located at any given time. For example, the MIB could store the latitude, longitude, altitude, and other geographic information such as a local map of the area of each access point.

The precision available in this type of mapping scheme is distinguished from that typically achieved in a cellular telephone system. In a cellular telephone system a user transmits a beacon signal at a fixed frequency. When the user moves from a first "cell" to a second "cell", the receiver located at the midpoint of the first cell no longer picks up the beacon signal, and the receiver located at the midpoint of the second cell picks up the beacon signal. A cellular telephone "handoff" in which the phone call is now under control of the second cell then takes place. It is only possible to locate the user to a relatively large area defined by the cells. There is no provision for locating the user more precisely within the cell. Thus, a cellular system is limited in its ability to provide services requiring the precise location of the user.

In the present invention, it is only necessary to provide the mobile unit a method of determining its own location. It is not necessary to provide tracking of the mobile unit's whereabouts. For example, upon establishing a connection with an AP 10, the mobile unit 5 can transmit a message inquiring "Where is this AP?" Upon receiving the answer that the AP 10 is located at the user's destination airport, the mobile unit can then transmit an E-mail to a car rental agency or hotel to AP 10. AP 10 routes the message through a network connected to AP 10 so that the user's car or hotel room is ready upon his arrival. Once the message is provided to the AP, it is not necessary to continue to track the user.

In another approach according to the invention, one or more selected APs 10 can be programmed to watch for the arrival of a particular mobile unit (target mobile unit). Upon detecting the presence of the target mobile unit, the AP 10 establishing the link with the target mobile unit sends a message directly to the rental car agency, hotel, etc. Since the message has been sent, one APs can then be directed to cease watching for the target mobile unit.

Another feature according to the invention allows the user to access a service provider over a network connected through the access point. For example, upon establishing its location, a mobile unit can direct an inquiry through the AP over the network connected to the user's bank to locate the nearest ATM. Since the user's location is established with relative precision by the location of the AP, the service provider can respond with a message such as "Straight ahead to exit 3, turn right and proceed two blocks." The message is routed to the user through the same AP.

According to the invention, service can be initiated by the mobile unit's transmission of an inquiry requiring a response. Alternatively, service can be initiated by an element of the network, such as a service provider, when an AP 10 detects the presence of a mobile unit. As an element of the network, the AP 10 could access its memory to initiate the service or transmit a message over the network to a service provider who initiates the appropriate service.

A system according to the invention could include a plurality of APs and mobile units and could be configured to allow all users access to all service providers on a network or to allow selected users access to selected service providers, depending on a service profile contracted for by the user. For example, according to the invention, system software could be programmed to provide service gates in which a user identification code is compared with a list of authorized codes for access to the particular service. In addition, users could contract for unlimited access for a fixed fee or for time billed access or some combination thereof. Service usage records for billing and other purposes can be maintained in an automated database, so that users can be billed by a single entity that maintains the network or APs or individually by each service provider.

Assume, for example, that a user of the mobile unit 5 is located at an airport and that several APs 10 are located at the same airport. The mobile unit 5 is connected to an antenna 6, and the AP 10 is connected to an antenna 3 which can both receive and transmit radio frequency (RF) signals at designated transmit and receive frequency bands. RF signals over-the-air from AP 10 are received by the antenna 6, and sent to mobile unit 5.

The mobile unit 5 can send information to the AP 10, for example, in order to retrieve messages or obtain information needed by the user or to send messages and data to other users. These messages are entered by the user through the mobile unit 5 or can be automatically generated, as in the previously described case of sending a message to a car rental company signalling the user's arrival at the airport. During this process, antenna 6 transmits the RF signal which is received by antenna 8 and sent to AP 10.

Figure 3:
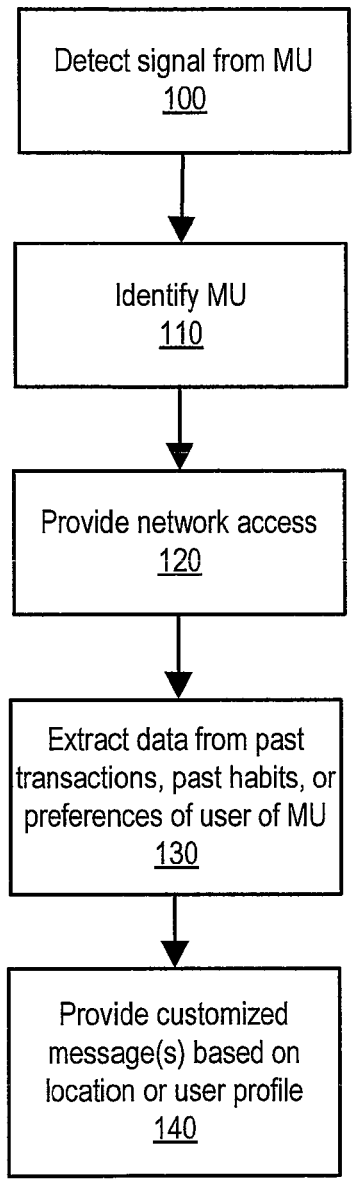
FIG. 3 is a flowchart showing a mobile unit interfacing with an access point, according to the system of FIG. 1.

In one embodiment, when a beacon signal output from the mobile unit 5 is detected and received by AP 10 (e.g. block 100 of FIG. 3), information in the beacon signal identifying the mobile unit is transmitted back to network 15 (e.g., block 110 of FIG. 3). The information sent back to network 15 includes the identification number of the mobile unit 5 and AP 10, thereby identifying both the user and his location to the network. Using this identification and location data, network 15 provides desired services (or arranges to provide desired services by accessing appropriate providers) and essential information to the user of the mobile unit 5 (e.g., block 120 of FIG. 3). Based on the type of information required, network 15 may access one or more information providers 20 to provide the information or services to the user. One or more information providers 20 are coupled to network 15 in a ring-network configuration, a star-network configuration, or other type of connection known in the art.

Other query/response approaches to link the mobile unit 5 and AP 10 could also be employed within the scope of the invention. For example, AP 10 could scan its coverage area, thereby causing a mobile unit 5 in the area to generate a response using active or passive circuitry. Such a response could be either a simple presence indication causing the AP 10 to transmit a further identification message requesting the mobile unit's identification information. Alternatively, in response to an AP scan, the mobile 5 could transmit its identification data immediately. Since a mobile unit may be in an area serviced by an AP for some time, either the AP or the mobile unit could be configured to determine if any correspondence is necessary before engaging in further communication.

In a simplified configuration according to the invention, the mobile unit could be configured merely as a device to locate its user through the APs 10. In this case, a processor on the network 15 would then take the appropriate action, such as sending an E-mail to the user's car rental agency, upon detection of the user's presence by an AP.

Network 15 shown in FIG. 1 stores information in the MIB 25. MIB 25 is a mechanism, such as a memory, which allows the persistent storage of information needed by network 15 to operate. Examples of such information include a directory of all the elements (APs, mobile units, etc) in the network, the topology of the network, characteristics of individual network elements, characteristics of connection links, performance and trend statistics, and any information which is of interest in the operation of the network 15. For example, the MIB would store the precise longitude, latitude, altitude and other geographic information pinpointing the location of each AP 10. Alternatively, an access point can be located by its proximity to another known location. For example, an access point location may be defined as a particular hotel known to be a particular address or having known latitude and longitude coordinates. The extent of geographic area covered by an access point may be defined in the same ways.

In order to reduce message traffic over the network, all or part of MIB may be stored at one or more access points 10. In particular, static information which does not change, or changes relatively infrequently, can be stored in the AP 10. Thus, as shown in FIG. 1, AP 10 includes a memory 27 for storing at least a portion of the MIB. For example, memory 27 could store the location of the AP 10, the local map, local services and other information, such that routine requests for information from the mobile unit, such as "Were am I" requests need not be serviced over the network, leaving more resources for other message traffic.

By way of example and not limitation, service and information providers 20 may include car rental agencies, hotels, restaurants, airline reservation centers, banks, taxi services, bus and train reservation offices, printing services, on-line database services, message services, and E-mail providers, so that the user can receive messages. The system according to the invention may also provide the user access to updates an specific databases, such as a database maintained by the user's employer (e.g., a company rolodex) or the user's own personal databases and any other service which can be used in a remote manner.

Any of the service and information providers 20 may maintain in memory data files on members and subscribing merchants and have the ability to extract data from past transactions for each of the users to facilitate future plans (e.g., block 130 of FIG. 3). In this way, the service providers have available the information to learn the past habits and preferences of their subscribers and provide corresponding services for new transactions.

For example, upon learning that a business traveller is scheduling a trip to Austin, service and information providers 20 consider the previous trips by the traveller develop a suggested itinerary, and book travel, hotel, car and restaurant reservations. The information providers 20 acquire knowledge about the habits of the traveller over a period of time, store the information in a memory, and extrapolate information from past habits for probable future actions consistent with these past actions. For example, when arranging for a rental car, the information stored in the service provider's memory for a particular subscriber may indicate that the subscriber typically requests a four door intermediate size car. Referencing this information, the service provider would now reserve a similar vehicle, unless otherwise instructed by the mobile unit.

A system according to the invention also has processing and memory access to operate in an interactive or adaptable mode. For example, when the user of the mobile unit 5 arrives at the airport, his identity, as well as the fact that he is at the airport, is detected by AP 10 and transmitted to the network, for example using the beacon signal emitted from his mobile unit 5, as previously described. One or more service providers with access to transportation schedules, flight status information, hotel or automobile rental information, weather information, ground maps or other information desired by the user employs network 15 to send the user updated information about whether a connecting flight has been delayed, alternative routings, where to go to pick up a pre-specified rental car, directions to a preferred hotel and other types of information.

Since the location of the AP 10 communication with a mobile unit 5 is known precisely, service and information provider 20 can employ processors to provide only suitable information to the user and can track the user's last reported location. For example, since updated information can be sent to the mobile unit 5, based on the location of the mobile unit 5, information that is pertinent only to the fact that the user of the mobile unit 5 is at the airport need be sent back to the mobile unit 5 via the communication path between AP 10 and the mobile unit 5. Other information can be sent at other times.

For purposes of illustration, FIG. 1 shows one AP 10 and one service and information provider 20 connected to network 15. However, any number of such APs and service and information providers would typically be connected to network 15 to service any number of mobile units, the only limitations being physical ones, such as constraints on bandwidth.

In a variation of a system according to the invention, the mobile unit 5 initiates a request for information from the network 15. For example, the user of the mobile unit 5 finds the location of the nearest automatic teller machine (ATM) by entering the request into the mobile unit 5, which will be received by the nearest AP 10. AP 10 forwards this request for information to the network 15. Network 15 routes the request to a service and information provider who obtains the requested information transmits it back to mobile unit 5 through AP 10.

In another variation of a system according to the invention, network 15 is connected to other types of communications networks, such as a public switched telephone network (PSTN), whereby the user of the mobile unit 5 sends and receives information from/to the PSTN or other communication network through a service provider. The service provider would employ processors and other apparatus to convert protocols and data formats from those used on the network 15 to those compatible with the PSTN or other communication network. For example, the user may receive facsimile information from a PSTN connected to the network 15.

Another feature according to the invention is the ability to adjust time clocks in the mobile unit to display and generate schedules using the correct time in the time zone where the user is located. This feature could be accomplished by storing in the MIB a time zone identifying code for each access point and during communication between an access point and a mobile unit, notifying the mobile unit of the correct zone. Alternatively, the time zone information could be stored in the access point or the access point could be instructed to check with a time reference (e.g., Greenwich Mean Time) and calculate local time. Alternatively, the time zone could be determined for the longitude of the access point stored in the MIB. This determination could be made either by the information provider and transmitted as a time zone message to the mobile unit or could be determined in the mobile unit using the longitude information of the access point.

Still another feature according to the invention is the ability to provide customized messages based on the location of the active access point or on the user's profile (e.g., block 140 of FIG. 3). For example, a user accessing a network through an access point in a hotel may be provided information about promotions offered by that hotel or other affiliated hotels, airlines, car rental agencies or other providers of goods and services.

The apparatus and method according to the invention and many of its attendant advantages will be understood from the foregoing description and it will be apparent that various changes may be made in form, construction and arrangement of the parts thereof without departing from the spirit and scope of the invention or sacrificing all of its material advantages, the form described here being merely a preferred embodiment thereof.

I claim:

1. A method, comprising:

identifying a plurality of wireless connections of a plurality of wireless client devices to a wireless access point, wherein identifying a first wireless connection of the plurality of wireless connections comprises identifying a first user of a first wireless client device of the plurality of wireless client devices and identifying at least one of a geographic location of the wireless access point and a geographic location of the first wireless client device, wherein identifying a second wireless connection of the plurality of wireless connections comprises identifying a second user, different than the first user, of a second wireless client device, different than the first device, of the plurality of wireless client devices and identifying at least one of the geographic location of the wireless access point and a geographic location of the second wireless client device;

in response to identifying the first wireless connection of the first wireless client device to the wireless access point, retrieving information identifying at least a first action related to the first user of the first wireless client device;

in response to identifying the second wireless connection of the second wireless client device to the wireless access point, retrieving information identifying at least a second action related to the second user of the second wireless client device;

providing a plurality of network accesses onto a network to the plurality of wireless client devices through the wireless access point, wherein a first network access of the plurality of network accesses is provided to the first wireless client device based on identifying the first user and the at least the first action, wherein the first network access onto the network permits the first wireless client device to send first information to the network and receive second information from the network, wherein a second network access of the plurality of network accesses is provided to the second wireless client device based on identifying the second user and the at least the second action, wherein the second network access onto the network permits the second wireless client device to send third information to the network and receive fourth information from the network; and transmitting a plurality of advertisements to the plurality of wireless client devices via the plurality of network accesses through the wireless access point, wherein a first advertisement of the plurality of advertisements promotes at least one of a first good and a first service, is suitable for display by the first wireless client device, and is selected for transmission based on a first user profile associated with the first user of the first wireless client device and based on the at least one of the geographic location of the wireless access point and the geographic location of the first wireless client device, wherein the first user profile indicates the first user and the at least the first action, wherein a second advertisement, different than the first advertisement, of the plurality of advertisements promotes at least one of a second good and a second service, is suitable for display by the second wireless client device, and is selected for transmission based on a second user profile, different than the first user profile, associated with the second user of the second wireless client device and based on the at least one of the geographic location of the wireless access point and the geographic location of the second wireless client device, wherein the second user profile indicates the second user and the at least the second action.

2. The method of claim 1, wherein the at least the first action comprises payment of a fee in order to be provided the first network access.

3. The method of claim 1, wherein the wireless access point provides the first network access to the first wireless client device and provides the second network access to the second wireless client device.

4. The method of claim 1, further comprising:
displaying advertisements relating to a provider of the wireless access point on a display of the first wireless client device.

5. The method of claim 1,
wherein the at least the first action comprises a first past action of the first user of the first wireless client device;
wherein the at least the second action comprises a second past action of the second user of the second wireless client device; and
wherein the second past action is different than the first past action.

6. The method of claim 1, wherein the at least the first action comprises contracting for network access.

7. The method of claim 1, wherein the at least the first action comprises contracting for network access for a fee.

8. The method of claim 1, wherein at least one of the first wireless client device and the second wireless client device is a portable wireless client device operable to be carried by a respective user.

9. The method of claim 8, wherein the portable wireless client device is a wireless telephone.

10. The method of claim 1, further comprising:
receiving the first information from the first wireless client device, wherein the first information from the first wireless client device comprises at least one of an e-mail message, a request for information from a service provider, and a request for a current geographic location.

11. The method of claim 10, wherein the request for information from the service provider comprises a request for at least one of text data, voice data, map data, and video data.

12. The method of claim 10, wherein the request for information from the service provider comprises a request for directions to a geographic location where a service is performed.

13. The method of claim 10, wherein the request for information from the service provider comprises a request for directions to a geographic location of the service provider.

14. The method of claim 1, further comprising:
receiving the first information from the first wireless client device, wherein the first information from the first wireless client device is input by the first user of the first wireless client device.

15. The method of claim 1, further comprising:
receiving the first information from the first wireless client device, wherein the first information from the first wireless client device is automatically generated by the first wireless client device.

16. The method of claim 1, wherein the at least the first action comprises arriving at a geographic location.

17. The method of claim 1, wherein the at least the first action comprises at least one of arriving at an airport, renting a car, renting a hotel room, scheduling a trip for travel, scheduling restaurant reservations, requesting a current geographic location of the wireless client device, and requesting a geographic location of an establishment.

18. The method of claim 1, wherein identifying the at least one of the geographic location of the wireless access point and the geographic location of the first wireless client device comprises receiving the at least one of the geographic location of the wireless access point and the geographic location of the first wireless client device from the first wireless client device.

19. An article of manufacture comprising a computer readable memory medium including instructions that, when executed on a processing system, cause the processing system to perform functions, comprising:
identifying a plurality of wireless connections of a plurality of wireless client devices to a wireless access point, wherein identifying a first wireless connection of the plurality of wireless connections comprises identifying a first user of a first wireless client device of the plurality of wireless client devices and identifying at least one of a geographic location of the wireless access point and a geographic location of the first wireless client device, wherein identifying a second wireless connection of the plurality of connections comprises identifying a second user, different than the first user, of a second wireless client device, different than the first wireless client device, of the plurality of wireless client devices and identifying at least one of the geographic location of the wireless access point and a geographic location of the second wireless client device;

in response to identifying the first wireless connection of the first wireless client device to the wireless access point, retrieving information identifying at least a first action related to the first user of the first wireless client device;

in response to identifying the second wireless connection of the second wireless client device to the wireless access point, retrieving information identifying at least a second action related to the second user of the second wireless client device;

providing a plurality of network accesses onto a network to the plurality of wireless client devices through the wireless access point, wherein a first network access of the plurality of network accesses is provided to the first wireless client device based on identifying the first user and the at least the first action, wherein the first network access onto the network permits the first wireless client device to send first information to the network and receive second information from the network, wherein a second network access of the plurality of network accesses is provided to the second wireless client device based on identifying the second user and the at least the second action, wherein the second network access onto the network permits the first wireless client device to send third information to the network and receive fourth information from the network; and transmitting a plurality of advertisements to the plurality of wireless client devices via the plurality of network accesses through the wireless access point, wherein a first advertisement of the plurality of advertisements promotes at least one of a first good and a first service, is suitable for display by the first wireless client and is selected for transmission based on a first user profile associated with the first user of the first wireless client device and based on the at least one of the geographic location of the wireless access point and the geographic location of the first wireless client device, wherein the first user profile indicates the first user and the at least the first action, wherein a second advertisement, different than the first advertisement, of the plurality of advertisements promotes at least one of a second good and a second service, is suitable for display by the second wireless client device, and is selected for transmission based on a second user profile, different than the first user profile, associated with the second user of the second wireless client device and based on the at least one of the geographic location of the wireless access point and the geographic location of the second wireless client device, wherein the second user profile indicates the second user and the at least the second action.

20. The article of manufacture of claim 19, wherein the at least the first action comprises payment of a fee in order to be provided the first network access.

21. The article of manufacture of claim 19, wherein the wireless access point provides the first network access to the first wireless client device and provides the second network access to the second wireless client device.

22. The article of manufacture of claim 19, wherein the instructions that, when executed on the processing system, cause the processing system to perform functions, further comprising:
displaying advertisements relating to a provider of the wireless access point on a display of the first wireless client device.

23. The article of manufacture of claim 19, wherein the at least the first action comprises a first past action of the first user of the first wireless client device;

wherein the at least the second action comprises a second past action of the second user of the second wireless client device; and wherein the second past action is different than the first past action.

24. The article of manufacture of claim 19, wherein the at least the first action comprises contracting for network access.

25. The article of manufacture of claim 19, wherein the at least the first action comprises contracting for network access for a fee.

26. The article of manufacture of claim 19, wherein at least one of the first wireless client device and the second wireless client device is a portable wireless client device operable to be carried by a respective user.

27. The article of manufacture of claim 26, wherein the portable wireless client device is a wireless telephone.

28. A system comprising:
a processor coupled to a network; and
a memory medium coupled to the processor;
wherein the memory medium comprises program instructions executable by the processor to perform functions, comprising:
identifying a plurality of wireless connections of a plurality of wireless client devices to a wireless access point, wherein identifying a first wireless connection of the plurality of wireless connections comprises identifying a first user of a first wireless client device of the plurality of wireless client devices and identifying at least one of a geographic location of the wireless access point and a geographic location of the first wireless client device, wherein identifying a second wireless connection of the plurality of wireless connections comprises identifying a second user of a second wireless client device of the plurality of wireless client devices and identifying at least one of a geographic location of the wireless access point and a geographic location of the second wireless client device;

in response to identifying the first wireless connection of the first wireless client device to the wireless access point, retrieving information identifying at least a first action related to the first user of the first wireless client device;

in response to identifying the second wireless connection of the second wireless client device to the wireless access point, retrieving information identifying at least a second action related to the second user of the second wireless client device;

providing a plurality of network accesses onto the network to the plurality of wireless client devices through the wireless access point, wherein a first network access of the plurality of network accesses is provided to the first wireless client device based on identifying the first user and the at least the first action, wherein the first network access onto the network permits the first wireless client device to send first information to the network and receive second information from the network, wherein a second network access of the plurality of network accesses is provided to the second wireless client device based on identifying the second user and the at least the second action, wherein the second network access onto the network permits the second wireless client device to send third information to the network and receive fourth information from the network; and transmitting a plurality of advertisements to the plurality of wireless client devices via the plurality of network accesses through the wireless access point, wherein a first advertisement of the plurality of advertisements promotes at least one of a first good and a first service, is suitable for display by the first wireless client device, and is selected for transmission based on a first user profile associated with the first user of the first wireless client device, wherein the first user profile indicates the first user and the at least the first action, wherein a second advertisement, different than the first advertisement, of the plurality of advertisements promotes at least one of a second good and a second service, is suitable for display by the second wireless client device, and is selected for transmission based on a second user profile, different than the first user profile, associated with the second user of the second wireless client device, wherein the second user profile indicates the second user and the at least the second action.

29. The system of claim 28, wherein the at least the first action comprises payment of a fee in order to be provided the first network access.

30. The system of claim 28, wherein the wireless access point provides the first network access to the first wireless client device and provides the second network access to the second wireless client device.

31. The system of claim 28, wherein the program instructions executable by the processor to perform functions, further comprising:
displaying advertisements relating to a provider of the wireless access point on a display of the first wireless client device.

32. The system of claim 28,
wherein the at least the first action comprises a first past action of the first user of the first wireless client device;
wherein the at least the second action comprises a second past action of the second user of the second wireless client device; and
wherein the second past action is different than first past action.

33. The system of claim 28, wherein the at least the first action comprises contracting for network access.

34. The system of claim 28, wherein the at least the first action comprises contracting for network access for a fee.

35. The system of claim 28, wherein at least one of the first wireless client device and the second wireless client device is a portable wireless client device operable to be carried by a respective user.

36. The system of claim 35, wherein the portable wireless client device is a wireless telephone.

* * * * *